July 10, 1951  R. E. BURKE ET AL  2,559,707
APPARATUS FOR DYNAMICALLY BALANCING TIRES, WHEEL
ASSEMBLIES AND THE LIKE
Filed Oct. 15, 1946  4 Sheets-Sheet 2
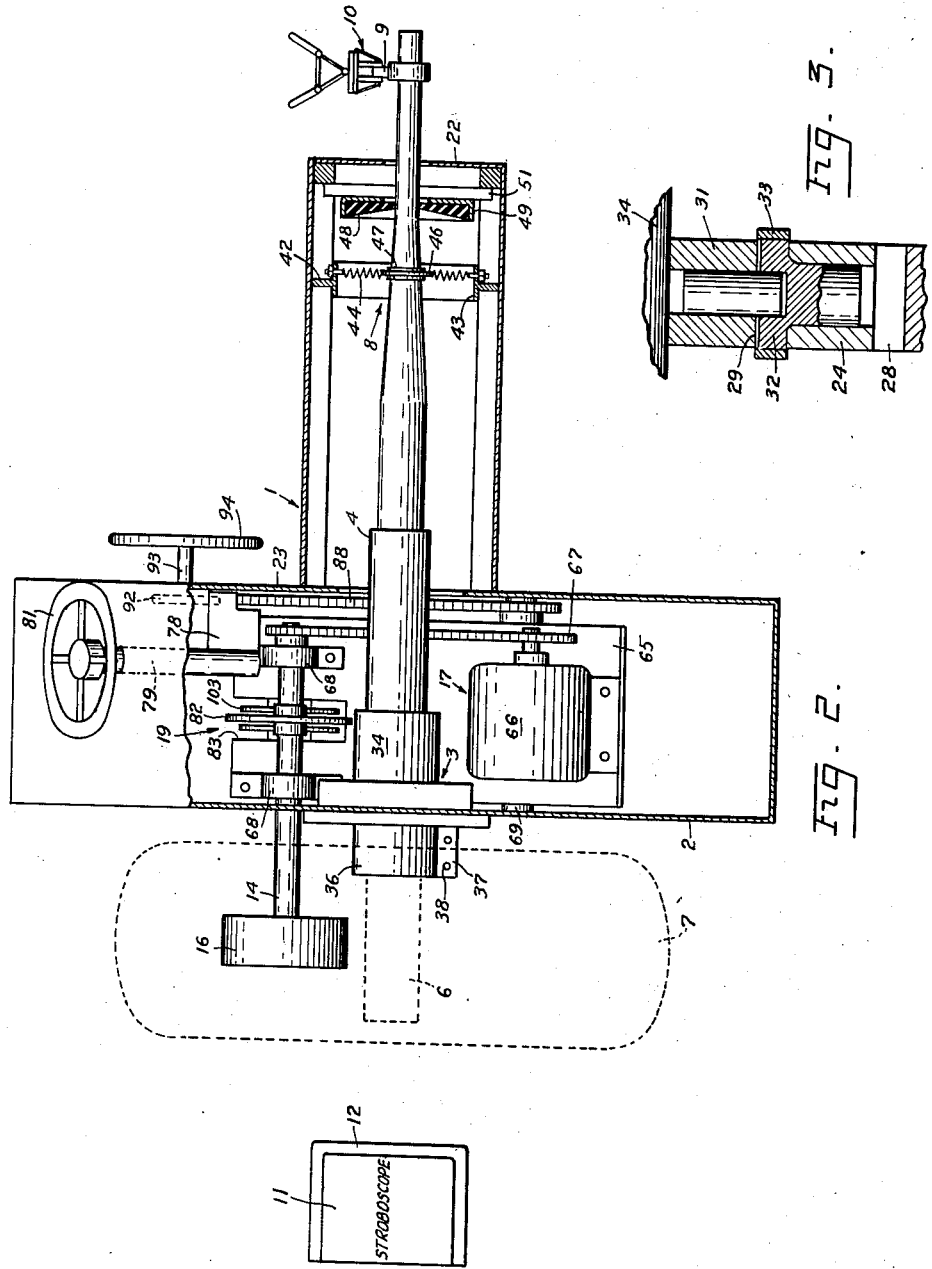
INVENTORS
ROSCOE E. BURKE
MARCEL PERIAT
WALTER SCHLICHTMANN
BY
George B White
ATTORNEY INVENTOR.
ROSCOE E. BURKE
MARCEL PERIAT
WALTER SCHLICHTMANN
BY George B. White
ATTORNEY July 10, 1951 — R. E. BURKE ET AL — 2,559,707
APPARATUS FOR DYNAMICALLY BALANCING TIRES, WHEEL ASSEMBLIES AND THE LIKE
Filed Oct. 15, 1946 — 4 Sheets-Sheet 4
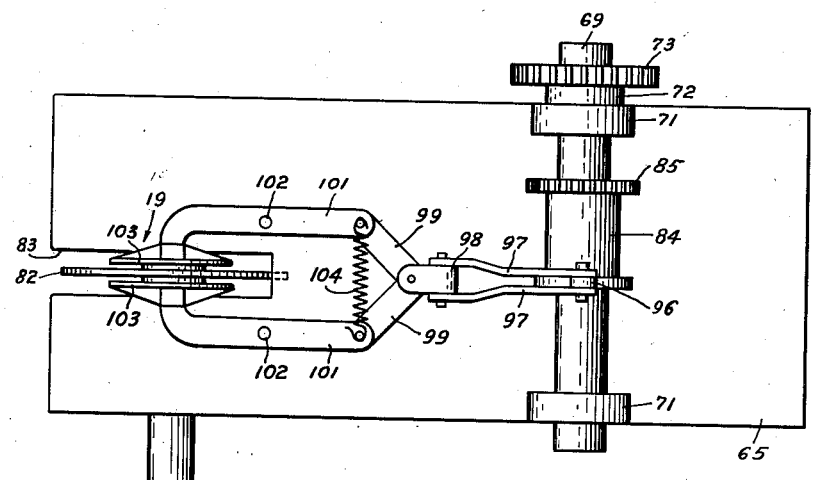
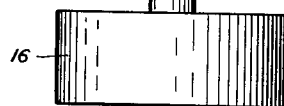
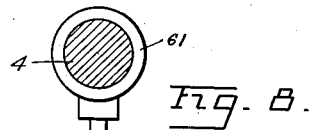
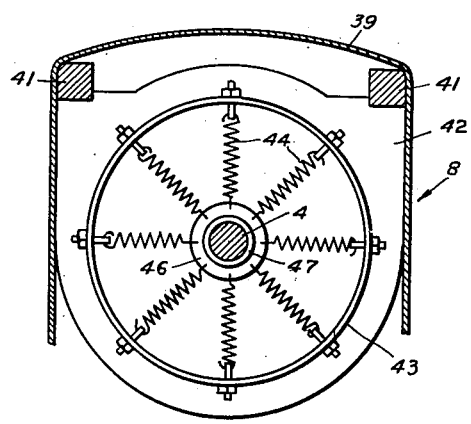
INVENTOR.
ROSCOE E. BURKE
MARCEL PERIAT
WALTER SCHLICHTMANN
BY George B. White
ATTORNEY Patented July 10, 1951

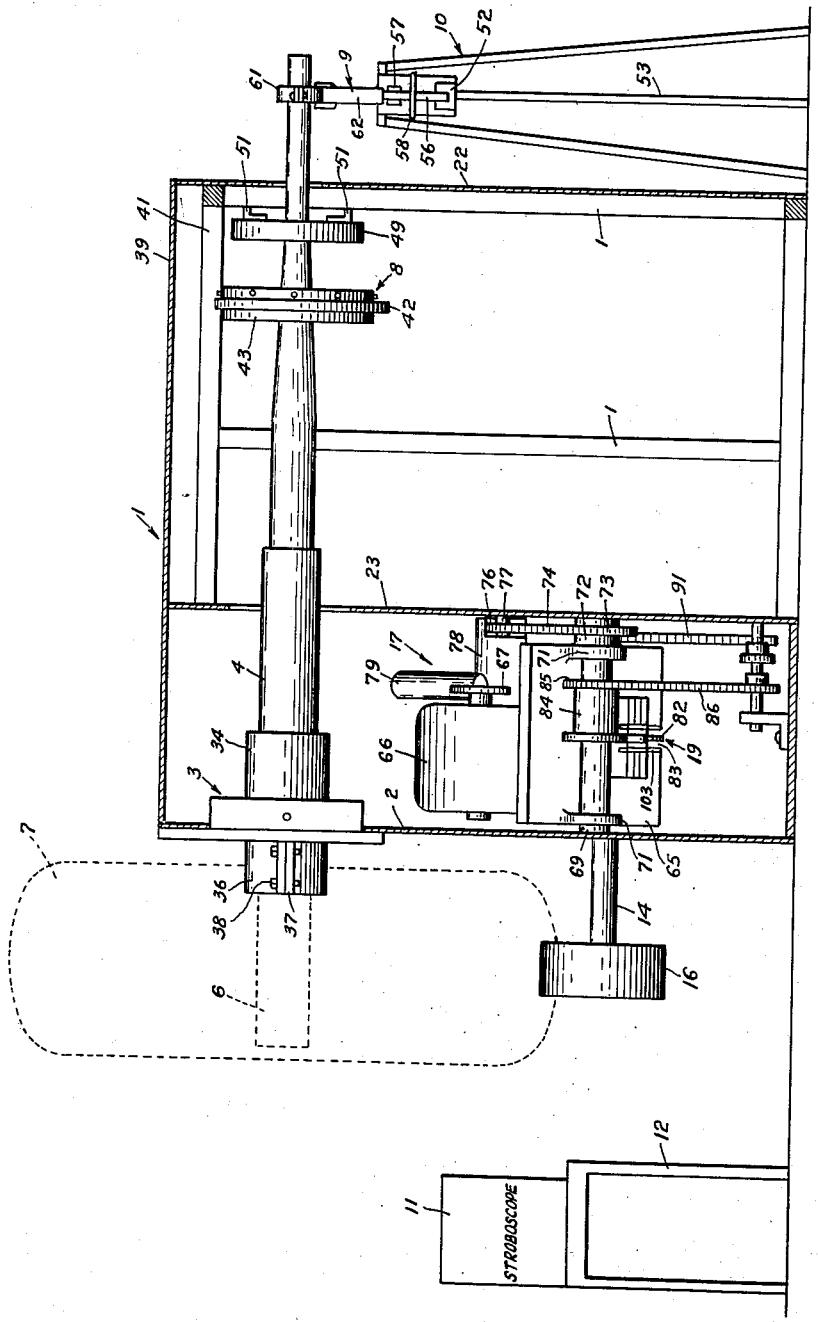

2,559,707

UNITED STATES PATENT OFFICE 2,559,707

APPARATUS FOR DYNAMICALLY BALANCING TIRES, WHEEL ASSEMBLIES, AND THE LIKE

Roscoe E. Burke, San Jose, Marcel Periat, San Mateo, and Walter Schlichtmann, San Francisco, Calif.

Application October 15, 1946, Serial No. 703,370

4 Claims. (Cl. 73—66)

This invention relates to a method and apparatus for dynamically balancing tires, wheel assemblies and the like.

Unbalance of rotating bodies is divided in two phases, namely the static unbalance, being the unbalance detectable without revolving the body at operating speeds, and dynamic unbalance, that which can be detected only by rotating the body under conditions approximating to those of its normal operation. A body is set to be in static balance if its center of gravity lies on its axis of rotation. If a body in static balance is divided into two parts by a plane passing through its axis of rotation, and through any point in its circumference, then the sums of the moments comprising each part will be equal. For this purpose theoretically, any rotating body may be regarded as being built up of a large number of layers, or laminae, lying at right angles to its axis of rotation and each having its own center of gravity. By determining the separate forces involved in these various layers, the center of gravity of the mass as a whole may be found. The resultant of the whole of the various unbalanced forces involved in the separate laminae is situated at the center of gravity of the whole body, lying at a distance from the axis of rotation and denoting the moment or force which create static unbalance, which is the resultant of multiplying the amount of unbalance by its distance from the center of gravity. To counteract the related effects it is necessary to introduce an equal and opposite force or forces having a resultant equal and opposite in effect to the resultant unbalancing force and in the same axial plane.

It is important to note that, for the elimination of static unbalance only, the correction may be applied anywhere in this axial plane, that is in the plane which passes through the center of gravity and also the axis of rotation, provided it is on the correct side of the axis of rotation. The other essential point being that the product of the weight applied and its radial distance from the axis of rotation should equal the product of the weight of unbalance and its radial distance from the axis of rotation.

Assuming that a body is in static balance, and that two unbalanced weights are added at equal radii at opposite ends of the body, the addition of the equal weight at equal radial distances from the axis of rotation does not affect the static balance of the body, but this extra weight developes a centrifugal force at each off-center weight on the opposite sides. In other words, there are two equal and opposite centrifugal forces acting a given distance to produce a rocking moment or centrifugal couple. A couple can only be neutralized by an equivalent and opposite couple acting in the same plane. This is usually effected by adding or removing equal amounts of material at two points in the same axial plane so that the centrifugal couple produced shall balance the original unbalance couple.

There were several attempts made in the past to develop a dynamic balancing method and apparatus. Most of the prior experiments involved the trial and error type balancing. In one common type of such dynamic balancing machine, a so-called scriber is utilized which, however, requires the rotation of the wheel in opposite directions successively for comparison of the vibration charts which are scribed by Prussian blue or red lead or the like coloring material. Such devices usually run on several bearings and the unbalance on the bearings will cause the vibration. Another previous type vibrates a whole table or base and an electromagnet is used for the purpose to bring the table to rest. The result will be the equivalent of the couple causing the unbalance. In each case as heretofore, the rotating body was supported on a rotating spindle or shaft on two bearings and the oscillation of either the table or the bearings or the shafts were translated into a graph of an indication of certain characteristics of the unbalance.

In our invention, I utilize the effect of the centrifugal couple caused by dynamic unbalance and the resulting tendency of the rotating body to change its plane of rotation from a plane at right angles to the axis of rotation to a plane at an angle of rotation. This tendency of the centrifugal couple to force the rotating body to tilt out of its plane of rotation is then utilized through the corresponding oscillation or whipping of the shaft on which the body rotates to determine the diameter on which the unbalancing couple lies, the radial distance of the unbalancing couple or mass, and the direction into which the unbalancing force is exerted with respect to the plane of the rotating body. Thereafter, the balancing couple can be applied and the dynamic unbalance corrected.

A particular feature of the invention is to reproduce as much as possible all the actual conditions under which the rotating body operates. For instance, in connection with tire and wheel assemblies, the rotating of the wheel assembly is accomplished in our invention by the creation of conditions equivalent to the usual ground speed created under a particular speed of travel of such tire and wheel assembly on the road. Thus the centrifugal unbalancing couple is acting upon the rotating tire and wheel assembly and on the shaft supporting the same in about the same manner as it would act upon it in actual operation.

Another feature of the invention is to utilize a stroboscope in synchronized relation with the oscillation of the shaft as caused by the unbalancing centrifugal couple upon the rotating tire and wheel assembly, and then to utilize a device to determine the direction and degree of oscillation of the shaft as caused by said centrifugal couple.

Another feature of the invention is to reproduce on the tire assembly a drive of actual road conditions and to rotate this tire assembly on a non-rotating shaft, which shaft, however, can be universally shifted around a fulcrum according to the unbalancing couple, if any, on the tire and wheel assembly, the said shaft being so mounted that it is resiliently held in its initial balanced position.

Another feature of this invention is to provide an adjustable driving mechanism to apply frictional drive to the periphery of the tire of any diameter at the selected or required speed corresponding to the usual road speed of the tire.

A further object of this invention is to provide suitable means for applying braking force to the driving elements or bringing the tire driving means to a rest when so desired.

A further feature of the invention is the operation of the stroboscope by the shaft itself upon which the tire rotates and in accordance with the cycle of off-center displacement of said shaft as caused by the unbalancing couple on the rotating tire.

The essential features of the invention involved in the carrying out of the objects indicated are susceptible to modification, but a preferred embodiment of the invention is shown in the accompanying drawings, in which:

Fig. 1 is a partly sectional side view of the dynamic balancing apparatus constructed in accordance with our invention;

Fig. 2 is a partly sectional top plan view of the dynamic balancing apparatus;

Fig. 3 is a fragmental sectional detail view of a journal of the shaft mounting of the apparatus;

Fig. 7 is a plan detail view of the braking mechanism for the driving roller;

Fig. 8 is a sectional detail view of the circuit breaking and making device related to the rear end of the shaft; and Fig. 9 is a partly sectional detail view of the balancing resilient support near the rear end of the supporting shaft.

Figure 4:
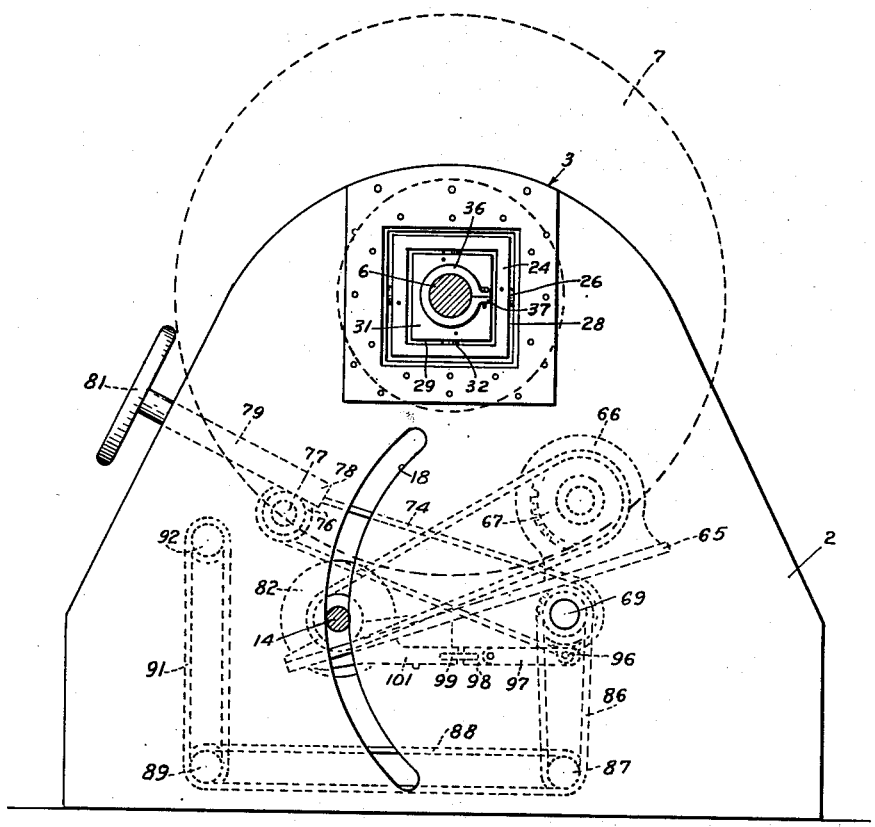
Fig. 4 is a partly sectional end view of the dynamic balancing apparatus.
Figure 5:
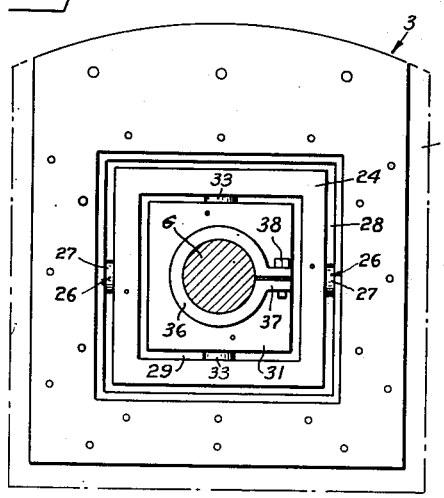
Fig. 5 is a partly sectional detail view of the universal fulcrum for the shaft or beam of the apparatus.
Figure 6:
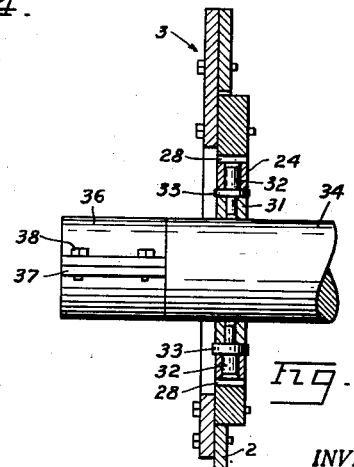
Fig. 6 is a sectional view of said universal shaft mounting.

The general principle of our invention involves the rotating of the body in accordance with the condition of its normal operation on a stationary support and transmitting to the stationary support through a universal fulcrum, a substantially gyrating movement in accordance with the unbalancing centrifugal couple on said rotating element, and the operation of a stroboscope opposite said rotating element in synchronism with said gyrating movement of said support. The stroboscope operates in synchronism with said gyrating movement and provides for fixed observation of the rotating element on the diameter where the unbalancing centrifugal couple is located on said rotating element to be tested, and thereby determines the diameter on which the counterbalancing centrifugal couple is to be applied. The gyrating movement of the support may also act upon a vibration measuring device for measuring the extent of the gyration from the original straight position during the operation of the device and also the direction of the tilting forces applied by the centrifugal couple with respect to the plane of the rotating element. More particularly, in our method the tire wheel is driven by peripheral friction applied by a roller at desired speed corresponding to the usual ground speed of the tire. The tire and wheel assembly is rotated on a non-rotating beam or shaft which latter is fulcrumed on a universal fulcrum to allow its responding to the tilting action exerted on the plane of the wheel. The gyrating movement of the beam or shaft under the effect of the unbalanced rotation of the wheel operates a circuit breaker or switch which controls an electronic stroboscope to flash a light upon the face of the tire in synchronism with the gyration of the shaft and therefore "stop" the wheel to the eye of the observer on the diameter on which the unbalancing centrifugal couple is located.

In the illustrative embodiment of our invention a frame 1 is provided, which in the present form is a box with suitable bearings and supports therein. On the front wall 2 of this box is provided a universal fulcrum support denoted in its entirety by the numeral 3 in which is supported a beam or shaft 4. The beam 4 extends in both directions axially from the universal fulcrum support 3. The front end 6 of the shaft 4 is adapted to support thereon a tire and wheel assembly 7. The tire and wheel assembly is rotatable on the forward end 6 of the beam 4. The rear portion of the beam 4 is supported in a resiliently balanced support denoted in its entirety by the numeral 8 as shown in detail in Fig. 8 which tends to normally hold the shaft or beam 4 in a horizontal initial position and tends to return the beam 4 from any deviation to such horizontal position. On the rear end of the beam 4 is provided a circuit breaker abutment device 9 which operates on a suitable circuit breaker 10 during each cycle of gyration of the beam 4 when the device is in operation. This circuit breaker 10 is connected by suitable electrical connections, not herein shown, to an electronic stroboscope 11 placed opposite the observable face of the tire and wheel assembly 7 as shown in Figs. 1 and 2. The electronic stroboscope 11 is supported on a stand 12 on a suitable level and at an adjusted distance from the tire and wheel assembly 7. Through a front wall 2 extends a drive shaft 14 which carries a drive roller 16 in frictional engagement with the periphery of the tire and wheel assembly 7 for driving the latter. Inside of the box frame 1 is provided an adjustable driving mechanism 17 which is connected to the drive shaft 14 and the roller 16 and which is adjustable to various diameters of the tires to be tested. For this purpose an arcuate slot 18 is provided in the front wall 2 to accommodate the shaft 14 throughout its various adjusted positions and to hold it at the selected radial distance from the center of the forward end 6 of the beam 4. In the box frame 1 is also provided a brake mechanism 19 for the purpose of stopping the rotation of the tire and wheel assembly 7 at will. A measuring device for the direction and extent of gyration of the shaft 4 may be located at the rear end of said shaft 4.

The frame 1 as herein shown is enclosed by a top wall and by the front wall 2 and is also closed at the rear end with a rear wall 22. A partition wall 23 extends parallel with the end wall 2 and is spaced therefrom for the purpose of separating a front compartment in which the adjustable drive mechanism 17 and the brake mechanism 19 are located. The box frame 1 is suitably reinforced throughout for supporting the weight of the beam and the tire and wheel assembly 7 thereon as well as the operating mechanisms and devices herein described.

The universal mounting 3 includes a substantially rectangular frame 24 which is journalled horizontally at journals 26 in spacing washers 27 and in the adjacent wall of the front wall 2. The spacing washers 27 are between the inner edges of a substantially rectangular opening 28 in the front wall 2. The frame 24 is journalled so that it is tiltable around the opposite horizontal journals 26. This rectangular frame 24 has in it a rectangular opening 29 in which in turn is positioned a rectangular block 31 which latter is journalled on vertical journals 32 in spacing washers 33, and in the frame 24. The latter washers 33 are positioned between the upper and lower walls of the opening 29 and the outer edges of the block 31 so as to journal said block 31 around a vertical axis. The beam 4 is extended through the block 31. A bushing 34 extends rearwardly from the block 31 for surrounding that portion of the beam 4 therein. A clamp bushing 36 extends forwardly from the block 31 and is clamped by flanges 37 and bolts 38 upon the forward end 6 of the beam 4.

The tilting force exerted by a centrifugal couple of unbalancing masses or forces on the rotating tire and wheel assembly 7 exerts tilting forces acting around the horizontal and vertical axes of said universal support 3 in such a way that as the tire and wheel assembly 7 rotates it shifts the entire beam 4 respectively around the horizontal and vertical axes of the universal support 3 in each cycle of rotation of said tire and wheel assembly. This movement will cause the rear end of the beam 4 to correspondingly move around at a proportionately increased radius. The portion of the beam 4 inside of the box 1 is considerably longer than the forward end 6 of the beam 4 and therefore, the gyration caused by the tilting forces of the unbalancing centrifugal couple on the tire and wheel assembly 7 are sufficiently enhanced at the rear end of the beam 4 to be observable and be capable of actuating the circuit breaker 18.

The resilient balancing support 8 at the rearward portion of the beam 4 is constructed in accordance with the structure shown in Fig. 8. This includes a hood 39 which extends over spaced longitudinal bars 41 on the frame 1 above the beam 4. On this hood 39 is in turn supported a plate 42 on which is a fixed ring 43. From the ring 43 extend radially toward the center of the ring 43 a plurality of coil springs 44 the outer ends of which are held on the ring 43 and the inner ends of each of which is secured to a flange 46 of a central bushing 47 in which latter the beam 4 is held. As the rear end of the beam 4 is swung around on a gyrating course around the universal support 3 as a fulcrum it pulls against certain of the springs 44 which have a tendency to return the beam 46 to its initial horizontal or aligned position.

In some instances additional resilient restraint is used between said resilient support 8 and the rear end of the beam 4, in the form of a resiliently elastic or flexible disc, for instance, a rubber disc 48 mounted in a cup 49 which latter in turn is fixed on the bars 51 of the frame 1. As the rear end of the beam 4 is swung around so that its axis describes substantially a cone, this flexible disc 48 is flexed and bent so as to urge the beam 4 back to its horizontal aligned position.

The switch control 10 for the stroboscope 11 and for the synchronised operation of said stroboscope with the cycle of gyration of the beam 4, is accomplished in the following manner: It is to be noted that the stroboscope 11 is of the charging type, namely, when each electric circuit is closed it charges a static electric charge which is discharged when the electric circuit is broken. One terminal of this actuating electric circuit is connected to a fixed contact 52 which is supported on a standard 53 in alignment with the rear end of the beam 4. A movable contact 54 is supported on a lever 56 fulcrumed on a bracket 57 on said standard 53 and is normally held against the fixed contact 52 by a resilient band 58 such as a so called rubber band. On the top of the lever 56 is a projecting arm 59 which extends toward and below the rear end of the beam 4. It is to be noted that the beam 4 is of even diameter from the forward end 6 to a substantially equal distance on the other side rearwardly of the support 3. Thereafter the beam 4 tapers downwardly and terminates in a portion of smaller diameter above the said circuit breaking projection 59. On this smaller end of the beam 4 is mounted a ring 61 carrying an abutment finger 62 which extends downwardly substantially vertically as shown in Fig. 9. As the beam 4 gyrates around the fulcrum in its universal support 3, its rear end with the finger 62 thereon also gyrates so that the center of the rear end of the beam 4 moves substantially in a circle. The finger 62 is moved in counter-clockwise direction viewing Fig. 9. When the finger 62 abuts against the projection 59 it moves the lever 56 around its pivot 57 so as to shift the movable contact 54 away from the stationary contact 52 and thereby break the charging circuit. Thereupon the stroboscope 11 discharges in a beam of light upon the face of the tire on the tire and wheel assembly 7. As the beam 4 gyrates further the finger 62 is moved upwardly with the rear end of the beam 4 and releases the projection 59 thereby allowing the contact 54 to close against the stationary contact 52 until the next cycle of gyration of the beam 4 is completed and until the next actuation of the stroboscope 11. In the initial position the finger 62 points downwardly in the vicinity of the projection 59 of the switch contact lever 56. As the wheel rotates the unbalancing couple whips the beam about its fulcrum so that the rear end of the beam gyrates in synchronism with the rotation of said couple about the axis of the beam. This gyration of the beam in turn shifts the finger 62 against and then past the contact projection 59 once during each gyration of the beam. The unbalancing couple is constantly in the same relative position to said finger 82, so that every time the contact lever 56 is caused to open the stroboscope circuit and a discharge occurs the unbalancing couple is in the same relative position with respect to the finger 82, thus the diameter on which said couple is located is indicated.

By actuating the stroboscope 11 electrically in synchronism with the completion of each cycle of gyration of the beam 4 the stroboscope light appears to bring to a stop the portion of the tire and wheel assembly 7 at a point on the diameter on which the off-balancing centrifugal couple is located on the tire 7. By observing a suitable usual marking on the tire or by providing predetermined markings, such as numerals or letters, to identify the various portions of the tire, the diameter on which the unbalancing centrifugal couple acts is thus determined. By applying another couple of counter-balancing weights on the same diameter and at equal distance from the center of the tire and wheel assembly 7, the tire can be balanced. The weight of the counter balancing couple is determined by experience. For instance, on the opposite sides on said diameter and at a predetermined distance from the axis of rotation are provided the counter-weight or counter-balancing forces, and then the wheel assembly is rotated again and thereby experimentally the proper counter-balancing forces are applied to the tire.

In order to render the apparatus adjustable to tires of various diameters, the shaft 14 and the driving mechanism 17 are supported adjustably on the frame 1. On a base or platform 65 is supported an electric motor 66 which is connected by a gear and chain transmission 67 to the drive shaft 14, as shown in Figs. 2 and 3. The drive shaft 14 is supported in bearing 68 on said platform 65 opposite the arcuate slot 18. The platform 65 is pivotally supported on a pivot shaft 69 by bearings 71 on the underside of the platform 65 approximately below the electric motor 66. The pivot shaft 69 is fixed in the walls 2 and 23 of the frame 1. From one of the bearings 71 extends a hub 72 which latter has a gear 73 on its outer periphery. This gear 73 has a chain 74 thereon, the other end of which chain 74 is connected to another gear 76 on a shaft 77 supported on said walls 2 and 23. A worm and gear transmission 78 on said shaft 77 is operated by a shaft 79 with a wheel 81 from the outside of the frame 1 so that when the wheel 81 is turned it turns the worm and gear transmission 78 thereby turning the shaft 77 and through the gears 76 and chain 74 rotates the gear 73 and thereby imparts a turning movement to the platform 65 around the pivot shaft 69. The arcuate slot 18 in the front plate 2 of said frame 1 is centered around the axis of the pivot shaft 69 so that as the platform 64 is turned around said pivot shaft 69 to adjusted positions, the drive shaft 14 moves in the slot 18 on said arc around said pivot shaft 69 as a center. According to this adjustment the drive roller 16 is moved toward and away from the center of the beam 4 to the position to suitably contact the periphery of a tire tested on said apparatus. The electric motor 66 is controlled in any suitable manner by a suitable rheostat or switch, not shown.

The brake mechanism 19 is illustrated in detail in Fig. 7. This brake mechanism includes a disc 82 fixed on the drive shaft 14. The diameter of this disc 82 is sufficiently large to extend through a slit 83 below the underside of the platform 65.

On the pivot shaft 69, heretofore described, is rotatably supported a brake sleeve 84 which has a gear 85 thereon connected by a chain 86 and through gears 87 and chain 88 and another gear 89 and chain 91 to a gear 92 on a shaft 93, which latter extends to the outside of the housing of the frame 1 and is manipulated through a wheel 94 so that when the wheel 94 is turned, rotation is transmitted through said gears and chains to the brake sleeve 84. From said brake sleeve 84 extends an ear 96. To this ear is pivoted a yoke link 97 which holds a saddle 98. In this saddle 98 are pivoted a pair of diverging links 99, to the ends of which latter are pivotedly connected arms 101. Each arm 101 is pivoted vertically on the underside of the platform 65 on a pin 102, substantially intermediate of the ends of the arms 101. The outer or free end of each arm 101 is turned toward the other and supports a brake disc 103 on each side of the disc 82 under the platform 65. A spring 104 connects the pivoted ends or link ends of the arms 101 and normally draws them toward one another. The action of the spring is to pull the pivoted ends of the arms 101 toward one another and thereby move the free ends of the arms 101 apart around the pivots 102 so as to keep the brake disc 103 away from the disc 82. When the sleeve 84 is turned in a clockwise direction viewing Fig. 3, so as to move the ear 96 toward the shaft 14, it spreads the links 99 apart from one another against the action of the spring 104 and thereby force the free ends of the arms 101 toward one another and moves the brake disc 103 against the opposite sides of the disc 82 to apply the braking force for stopping the rotation of the shaft 14, and of the roller 16 and thereby stop the rotation of the tire and wheel assembly 7. Upon turning the sleeve 84 in the opposite direction, the discs 103 are moved away from the disc 82 and the braking action is released.

After the diameter of unbalance or the diameter on which the unbalancing couple or forces is located is determined by the action of the stroboscope as synchronised with the whipping or gyrating of the beam 4, the mass or forces of unbalance are determined by measuring the degree of gyration of the beam 4 from its initial horizontal position. There is a direct relation between the degree of the whipping of the beam 4 and the forces or the centrifugal couples which tend to tilt the tire 7 from its plane of rotation. Practical co-efficients are developed experimentally as they effect the varying weights of the various kinds of tires on the initial bending or changing of the axial position of the beam 4. From this starting position there is a deviation or gyration according to the unbalancing forces and by measuring the same the degree of such force can be determined. In view of the fact that this force is a product of the mass or weight of the unbalance and the radial distance of said unbalancing weight or correction, the direction can be determined first by selecting the radial distance for the correction, and then by arriving at the balancing weight to equal the product or moment of unbalancing forces. For determining this a suitable vibration meter or measuring device can be utilized which can be provided with scales or graduations arrived at experimentally so that a direct reading of correcting weight may be taken.

We claim:

1. In an apparatus for determining the diametrical location of unbalancing centrifugal couple on a rotating body, a frame, a supporting beam element on said frame, universal fulcrum means to support said beam element on said frame holding it against rotation, resiliently yieldable means to hold said beam element aligned in an initial position in said universal fulcrum means, said beam element extending beyond one side of said universal fulcrum means to support said rotating body, and said beam element extending on the other side of said universal fulcrum means, a stroboscope opposite the face of said rotating body, and a circuit control device actuated by said beam on said other side of said universal fulcrum and in synchronism with the cycle of shifting of said beam element under the force of said centrifugal couple on said rotating body, for actuating said stroboscope in synchronism with the cycle of deviating movement of said beam.

2. In an apparatus for determining the diameter on which an unbalancing centrifugal couple is located on a rotating wheel, a frame, a beam, a universal supporting fulcrum non-rotatably supporting said beam on the frame, an end of said beam being extended to one side of said fulcrum and being adapted to rotatably support said rotating wheel, the other end of said beam being extended to the other side of said fulcrum, resiliently yieldable means to hold said latter end of said beam in an initial balanced position, a stroboscope positioned opposite a face of said rotating wheel and outside the first end of said beam, and a circuit control device for said stroboscope actuated by said beam during the cycle of gyration of said beam.

3. In an apparatus for determining the diameter on which an unbalancing centrifugal couple is located on a rotating wheel, a frame, a beam, a universal supporting fulcrum non-rotatably supporting said beam on the frame, an end of said beam being extended to one side of said fulcrum and being adapted to rotatably support said rotating wheel, the other end of said beam being extended to the other side of said fulcrum, resiliently yieldable means to hold said latter end of said beam in an initial balanced position, a stroboscope positioned opposite a face of said rotating wheel and outside the first end of said beam, and a circuit control device for said stroboscope actuated by said beam during the cycle of gyration of said beam, said universal fulcrum including an outer block journalled at diametrically opposite sides thereof on the frame, an inner block in the outer block journalled on pivots at right angles to the journals of the first block, and means to fixedly secure said beam in said inner block.

4. In an apparatus for determining the diameter on which an unbalancing centrifugal couple is located on a rotating wheel, a frame, a beam, a universal supporting fulcrum on the frame for said beam, an end of said beam being extended to one side of said fulcrum and being adapted to rotatably support said rotating wheel, the other end of said beam being extended to the other side of said fulcrum, resiliently yieldable means to hold said latter end of said beam in an initial balanced position, a stroboscope positioned opposite a face of said rotating wheel and outside the first end of said beam, and a circuit control device for said stroboscope actuated by said beam in synchronism with the cycle of gyration of said beam, said universal fulcrum including an outer block journalled at diametrically opposite sides thereof on the frame, an inner block in the outer block journalled on pivots at right angles to the journals of the first block, and means to fixedly secure said beam in said inner block, the journals of said universal fulcrum being normally in the same plane.

ROSCOE E. BURKE.
MARCEL PERIAT.
WALTER SCHLICHTMANN.

REFERENCES CITED

The following references are of record in the file of this patent:

UNITED STATES PATENTS

| Number | Name | Date |
|---|---|---|
| 728,315 | Snell | May 19, 1903 |
| 1,838,615 | Greve | Dec. 29, 1931 |
| 2,004,270 | Davey | June 11, 1935 |
| 2,018,160 | Weaver | Oct. 22, 1935 |
| 2,120,925 | Webster | June 14, 1938 |
| 2,341,141 | Greenleaf et al. | Feb. 8, 1944 |
| 2,341,444 | Hunter | Feb. 8, 1944 |
| 2,363,316 | Hagg | Nov. 21, 1944 |
| 2,464,662 | Young | Mar. 15, 1949 |